(12) United States Patent
Dabrowski et al.

(10) Patent No.: US 11,397,284 B2
(45) Date of Patent: Jul. 26, 2022

(54) FLEXIBLE HYBRID ELECTRONIC SENSING SYSTEM FOR UAV APPLICATIONS

(71) Applicant: The Boeing Company, Chicago, IL (US)

(72) Inventors: Ted R. Dabrowski, Madison, AL (US); John Dalton Williams, Decatur, AL (US)

(73) Assignee: The Boeing Company, Chicago, IL (US)

( * ) Notice: Subject to any disclaimer, the term of this patent is extended or adjusted under 35 U.S.C. 154(b) by 461 days.

(21) Appl. No.: 16/676,874

(22) Filed: Nov. 7, 2019

(65) Prior Publication Data

US 2022/0206142 A1 Jun. 30, 2022

(51) Int. Cl.
*H01Q 21/06* (2006.01)
*H01Q 21/22* (2006.01)
*G02B 1/11* (2015.01)
*G01S 13/02* (2006.01)

(52) U.S. Cl.
CPC .............. *G02B 1/11* (2013.01); *H01Q 21/06* (2013.01); *H01Q 21/065* (2013.01); *H01Q 21/22* (2013.01); *G01S 2013/0245* (2013.01); *G01S 2013/0254* (2013.01); *G01S 2201/06* (2019.08)

(58) Field of Classification Search
CPC ........ G02B 1/11; H01Q 21/06; H01Q 21/065; H01Q 21/22; G01S 2013/0245; G01S 2013/0254; G01S 2201/06
See application file for complete search history.

(56) References Cited

U.S. PATENT DOCUMENTS

| | | | | |
|---|---|---|---|---|
| 8,201,773 | B1 * | 6/2012 | Durham | B64C 39/028 244/49 |
| 9,059,508 | B2 * | 6/2015 | Worl | H01Q 3/2617 |
| 10,613,216 | B2 * | 4/2020 | Vacanti | G01S 13/933 |
| 11,201,410 | B2 * | 12/2021 | Dabrowski | H01Q 21/0075 |
| 2017/0098888 | A1 * | 4/2017 | Geary | H01Q 1/3283 |
| 2021/0091463 | A1 * | 3/2021 | Shahvirdi Dizaj Yekan | H01Q 3/36 |
| 2021/0143544 | A1 * | 5/2021 | Dabrowski | H01Q 1/28 |
| 2021/0305720 | A1 * | 9/2021 | Zhang | H01Q 17/008 |

* cited by examiner

*Primary Examiner* — Vibol Tan
(74) *Attorney, Agent, or Firm* — McDonnell Boehnen Hulbert & Berghoff LLP

(57) ABSTRACT

In examples, systems and methods for a radiating system of an aircraft are described. The aircraft system includes a conformal antenna array having a flexible substrate configured to conform to a curvature of a portion of an aircraft. Additionally, the conformal array has a plurality of antenna elements coupled to a first surface of the flexible substrate, where the plurality of antennas are formed in an array. The aircraft system further includes radio front-end hardware configured to communicate signals to and from the plurality of antenna elements. Moreover, the aircraft system includes a radar processing system coupled to the radio front-end hardware. Yet further, the aircraft system includes a renewable energy source configured to power the radar processing system and the radio front-end hardware.

20 Claims, 9 Drawing Sheets

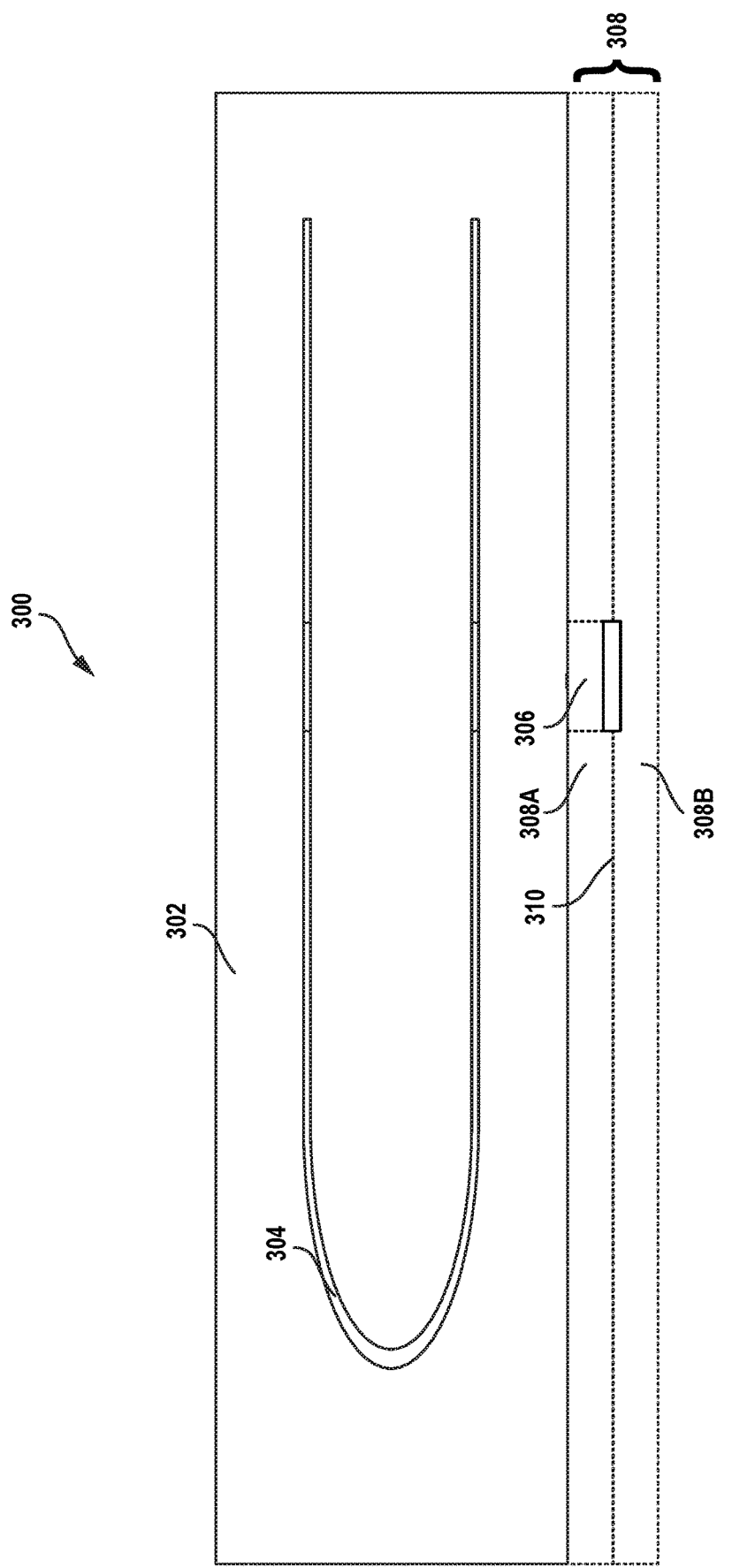

FLEXIBLE HYBRID ELECTRONIC SENSING SYSTEM FOR UAV APPLICATIONS

FIELD

Embodiments of the present disclosure relate generally to antennas. More particularly, embodiments of the present disclosure relate to antenna structures including the associated feeding of array structures.

BACKGROUND

Radio systems generally use antennas to transmit and receive signals. The direction at which signals are transmitted and received is based on a radiation pattern of the antenna. The radiation pattern of an antenna specifies a region over which an antenna can efficiently transmit and receive radio signals.

Some radio systems are configured having multiple antennas forming an array of antennas. An array may be an arrangement of antennas that have a physical layout that produces desirable antenna properties. For example, antennas may be arranged in a linear array with the antennas aligned on a line, a two dimensional array with the antennas aligned on a plane, or other possible antenna array arrangements as well. The array may have a radiation pattern that is the superposition (i.e., sum) of the radiation patterns of the individual antennas. In some arrays, the relative power and phasing of various antenna elements may be adjusted in order to create a desired radiation pattern.

SUMMARY

In one example, aircraft system is disclosed. The aircraft system includes a conformal antenna array having a flexible substrate configured to conform to a curvature of a portion of an aircraft. Additionally, the conformal array has a plurality of antenna elements coupled to a first surface of the flexible substrate, where the plurality of antennas are formed in an array. The aircraft system further includes radio front-end hardware configured to communicate signals to and from the plurality of antenna elements. Moreover, the aircraft system includes a radar processing system coupled to the radio front-end hardware. Yet further, the aircraft system includes a renewable energy source configured to power the radar processing system and the radio front-end hardware.

In another example, a method of method of operating a radio system is disclosed. The method includes providing power to a radar processing system and a radio front-end hardware from a renewable power source. Additionally, the method includes creating a low-frequency signal for transmission by the radar processing system and communicating the low-frequency signal to the radio front-end hardware. The method further includes upconverting the low-frequency signal to a radar signal by the radio front-end hardware, where the radio front-end hardware is located on a backside of a flexible substrate. The method yet further includes coupling the radar signal to a corporate feed beamforming network. Moreover, the method includes radiating the radar signal by an antenna array coupled to the corporate feed beamforming network, where the antenna array is located on a front side of the flexible substrate.

In one yet another example, a radiating structure is disclosed. The radiating structure includes a flexible substrate having a top surface, a bottom surface, and a plane located between the top surface and the bottom surface, where the plane is substantially parallel to at least one of the top surface and the bottom surface. The radiating structure further includes an antenna array comprising a plurality of antenna elements in a two-dimensional array, where the antennas are coupled to the top surface of the flexible substrate. Moreover, the radiating structure includes radio front-end hardware configured to communicably couple to a radar processor. The radio front-end hardware is located on the bottom surface of the flexible substrate. Additionally, the radio front-end hardware is configured to upconvert signals from the radar processor and output a radar signal. The radiating structure also includes a corporate feed beamforming network coupled between at least a subset of the plurality of antenna elements and the radio front-end hardware, where the corporate feed beamforming network is configured to feed the radar signal from the radio front-end hardware to the at least a subset of the plurality of antenna elements.

The features, functions, and advantages that have been discussed can be achieved independently in various embodiments or may be combined in yet other embodiments further details of which can be seen with reference to the following description and drawings.

BRIEF DESCRIPTION OF THE FIGURES

Example novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 3B illustrates a side view of an example patch antenna having a slot, according to an example embodiment.

DETAILED DESCRIPTION

Figure 1A:
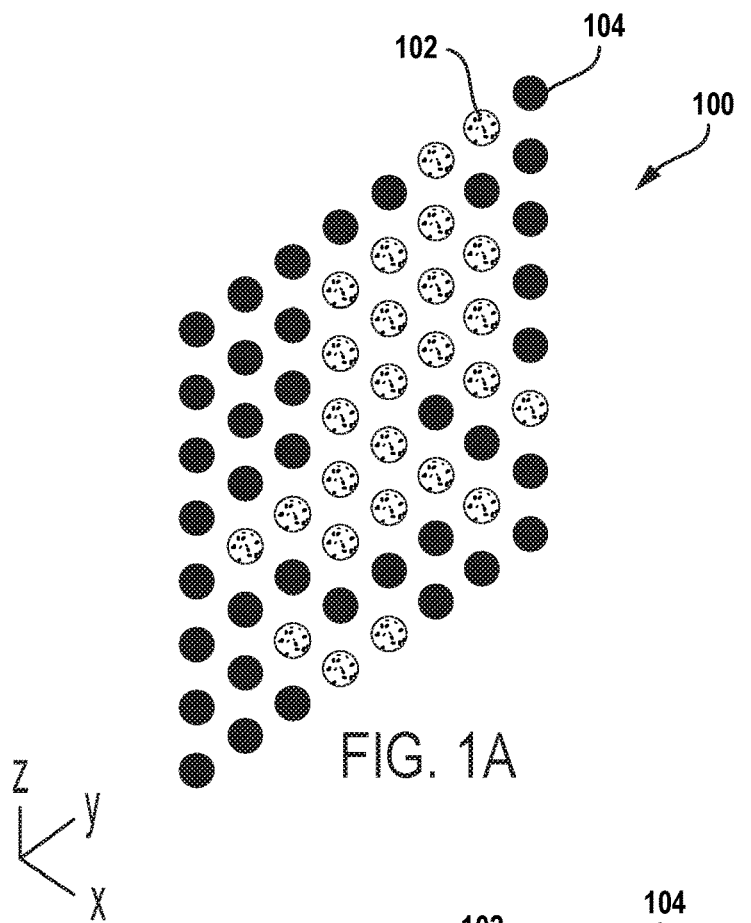
FIG. 1A illustrates an example antenna array on a flat surface.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

As previously discussed, when operating an array, the antenna elements may have relative power and phasing to create a desired radiation pattern. In some instances, it may be desirable to have a main beam having a predetermined beam width and sidelobes (i.e., grating lobes) that are below a sidelobe threshold. In practice, such as in a radar system, it may be desirable for the main beam to be relatively narrow and for sidelobes to be −15 dB (or less) with respect to the main lobe. Sidelobes are undesirable because they direct energy in directions other than the intended direction, increase received signal noise from reflections, cause the reception of unintended signals, increase clutter signals in radar applications, etc.

In conventional arrays, the antenna array may be a linear array or a two dimensional array on a flat surface. Determining relative power and phasing for the antenna elements on a flat surface is relatively straightforward based on mathematical calculations based on the antenna array dimensions, antenna spacing, and antenna radiation pattern. However, when the array is not on a flat surface, such as a conformal array on a curved surface, the mathematics for determining relative power and phasing for the antenna elements becomes significantly more complicated. Thus, determining relative power and phasing for the antenna elements of a conformal array on a curved surface may not easily be represented by a closed-form mathematical expression. The present disclosure includes the calculation of relative power and phasing for the antenna elements of a conformal array to produce the desired beam width and desired sidelobe levels, and use of such conformal array antenna elements.

Additionally, the present disclosure includes an antenna design that may be used in a conformal array. An example antenna that is provided as part of this disclosure is a patch antenna. The patch antenna may be mounted on a flexible substrate. The flexible substrate may be a single substrate upon which all the antennas of the array are mounted. The flexible substrate may allow the antenna array to conform to a surface of an aircraft. For example, the flexible substrate may be mounted to an external portion of an aircraft, such as the external metallic skin of the aircraft. By mounting the flexible substrate in a manner conforming to the surface of the aircraft, the array too may conform (i.e., form a curved shape) based on a curvature of the portion of the aircraft.

The present antenna may be a patch antenna. The patch antenna may be mounted on a flexible substrate and the antenna itself may be flexible as well. The antenna may be designed having a microstrip configured to feed the antenna. Additionally, the patch antenna may include a slot that has a length equal to 92.5% of the wavelength at a desired frequency of operation. In some examples, the slot may have a U shape. The U shape of the slot may cause an input impedance of a stripline feed of the antenna to be approximately 50 Ohms at the design frequency of the antenna. Other examples are possible as well.

The present disclosure also includes an aircraft system that, in some examples, may incorporate an antenna or an array as previously described. The aircraft system may include a conformal antenna array having a flexible substrate upon which an antenna array is formed. The array may also include radio front-end hardware configured to up-convert signals for transmission and down-convert received signals. The radio front-end hardware may be mounted on a backside of the flexible substrate. The system may also include a radar processing system coupled to the front-end radio hardware. The radar processing system may be configured to generate and output low-frequency radar signals to the front-end radio hardware. Additionally, the radar processing system may be configured to receive and process low-frequency radar signals from the front-end radio hardware. Moreover, the system may include a renewable energy source configured to power the radar processing system and the radio front-end hardware. In some examples, the renewable power source may be able to provide enough power to power both the radar processing system and the radio front-end hardware. In other examples, the renewable power source only provides some of the power to power both the radar processing system and the radio front-end hardware Referring now to the figures, FIG. 1A illustrates an example antenna array 100 on a flat surface. The example antenna array 100 is shown as a two dimensional array of antenna elements arranged on a flat surface. The example antenna array 100 has antenna elements that are aligned on a two dimensional grid on a plane. The example antenna array 100 is representative of a conventional two dimensional array. The example antenna array 100 includes a plurality of antenna elements, such as driven antenna 102 and undriven antenna 104. As shown in FIG. 1A, each element of the example antenna array 100 is either a driven element (unshaded circles) or undriven elements (shaded circles). Each of the antenna elements that form the example array 100 may have the same physical structure as each other antenna array.

In practice, the example antenna array 100 may have a taper profile applied across the various antenna elements that form the example antenna array 100. By controlling the taper profile, the radiation pattern of the example antenna array may be controlled. For example, a main-lobe beamwidth of the antenna may be adjusted based on changing the taper profile. Additionally, sidelobe levels of the example antenna array 100 may be controlled based on the taper profile. When the taper profile is adjusted, the sidelobe levels produced by the operation of example antenna 100 may be reduced below a predetermined sidelobe level limit.

In some examples, the taper profile may specify whether each antenna should be driven (i.e., provided a signal to radiate) or undriven (i.e., the antennas are not provided with any signals to radiate). Additionally, because of the reciprocal nature of antenna arrays, the taper profile similarly specifies whether each antenna is coupled to a signal receiver or not. In other examples, a taper profile may specify a relative power level for each antenna element and/or a relative phase difference between respective antenna elements. While controlling power levels and phasing to the antenna elements may allow more fine-tuned control of the example antenna array 100 beam characteristics, controlling power and phasing may require more hardware and power. Thus, in some low-cost and low-power requirement antenna configurations, it may be desirable to use a taper profile that specifies whether each antenna is active or not.

When an antenna array operates, the radiating pattern is a superposition (i.e., summation) of the radiation patterns of the antenna elements of the array. Thus, the overall radiation pattern of the example antenna array 100 is the sum of the radiation pattern of each antenna of the array, including the respective taper profile for the antenna elements. Therefore, by adjusting the taper profile, the radiation pattern of the example antenna array 100 may be controlled. In practice, an array of antenna elements fed with the same phase will produce a radiation pattern having a narrower and higher gain pattern than the single antenna element radiation pattern. However, the sidelobe levels for the array may be greater than the sidelobes for a single antenna element.

Because of the planar nature of the example array 100 and the uniform spacing of antenna elements, the radiation pattern may be calculated in a closed-form expression. Similarly, because the radiation pattern may be solved with a closed-form expression, the taper profile for the example antenna array 100 may also be calculated to have a closed-form solution. Thus, an array designer may use desired array properties, such as beam-width and side-lobe levels to calculate the taper profile to generate the desired radiation pattern.

Figure 1B:
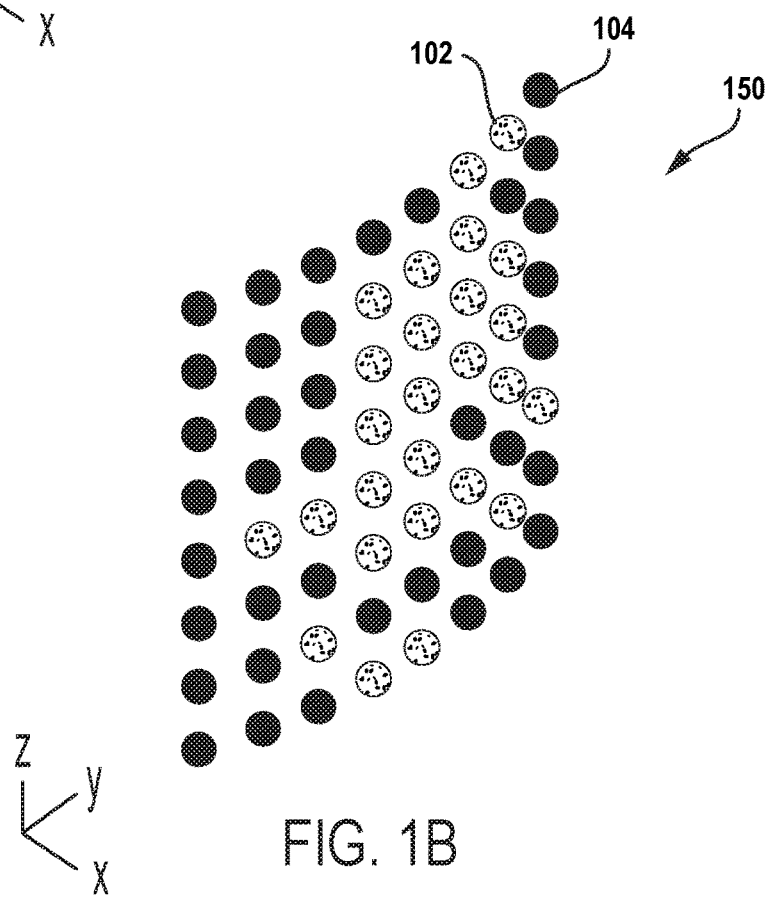
FIG. 1B illustrates an example conformal antenna array on a curved surface, according to an example embodiment.

FIG. 1B illustrates an example conformal antenna array 150 on a curved surface, according to an example embodiment. Unlike the example antenna array 100 of FIG. 1A, the conformal array 150 is not on a flat plane. Rather, the antenna elements that form the conformal antenna array 150 may be located on a curved surface. When the antenna elements no longer lie on a two-dimensionally planar surface, several issues arise. If the same taper profile is applied to the conformal antenna array 150 as to the example antenna array 100, the conformal antenna array 150 would likely produce much higher sidelobes. Additionally, it may be computationally intensive to determine a theoretical radiation pattern for the conformal antenna array 150. Although these problems exist, at present conformal arrays are designed by first determining a tapering for a planar array, applying the taper, and then conforming array. Thus, conformal arrays suffer from many performance issues.

Similar to what was described with respect to the example antenna array 100, the conformal antenna array 150 may also use a taper profile that may specify whether each antenna should be driven (i.e., provided a signal to radiate) or undriven (i.e., the antennas are not provided with any signals to radiate). FIG. 1B shows an example driven antenna 152 and an example undriven antenna 154. Additionally, a taper profile may be used that specifies a relative phasing and power for each antenna as well. However, due to the non-planar nature of the conformal antenna array 150, closed-form solutions for the taper profile are not readily calculable. Thus, the taper profile may be determined in a different way.

As previously discussed, present conformal arrays determine a taper profile when the array is a planar configuration, due to the simplicity of calculating the taper profile. But, this leads to an antenna that will generally perform poorly. Thus, the present disclosure is directed toward producing a better performing conformal array.

To design the conformal array 150, the designer may first design a flat array. Designing the flat array includes selecting an antenna element (such as the patch antenna described with respect to FIGS. 3A and 3B) for the array, choosing a number of antenna elements, and the element spacing. In some examples, the array may be a two dimensional array, with between 64 elements (in an 8×8 configuration) and 16384 elements (in a 128×128 array).

Once the base flat array is designed, a mapping may be used to map the flat array to the conformal surface. In some examples, the mapping may be a "bending" of the flat array onto the shape of the surface to which the antenna will conform. In other examples, the mapping may be a projection of the antenna elements into a position that conforms to the surface. Other mappings from the flat surface to a conformal shape are possible as well.

Once the mapping is created, the antenna may be stimulated in software to determine a base radiation pattern. In some examples, the antenna may be simulated using a method of moments simulation to determine the base antenna parameters. Based on the results of the simulation, a windowing function may be chosen. Some example windowing functions include a Chebyshev window, Hamming window, or other windowing function. The windowing function that is chosen may be based on some parameters of the antenna design, such as beamwidth, desired sidelobes, or other design criteria. The result of the windowing function may be the taper profile.

In examples where low power and low complexity are desired, the windowing function may include constraints that specify that antennas may only be enabled or disabled. An array where antennas are only enabled or disabled may be known as a sparse array. In other examples, the windowing function may include constraints that specify that antennas may have relative power and/or phase adjustments.

Once the taper profile is determined, the conformal antenna array 150 may be simulated with the given taper profile. The results of the simulation may be compared to the design criteria. If the design criteria are met, the taper profile may be used for the construction of the antenna. Otherwise, a different windowing function or different constraints on the windowing function may be used. Thus, unlike conventional conformal array designs, the present conformal antenna array 150 determines the taper profile of the antenna in its conformed state, not in its flat state. Thus, overall array performance may be increased.

Figure 2:
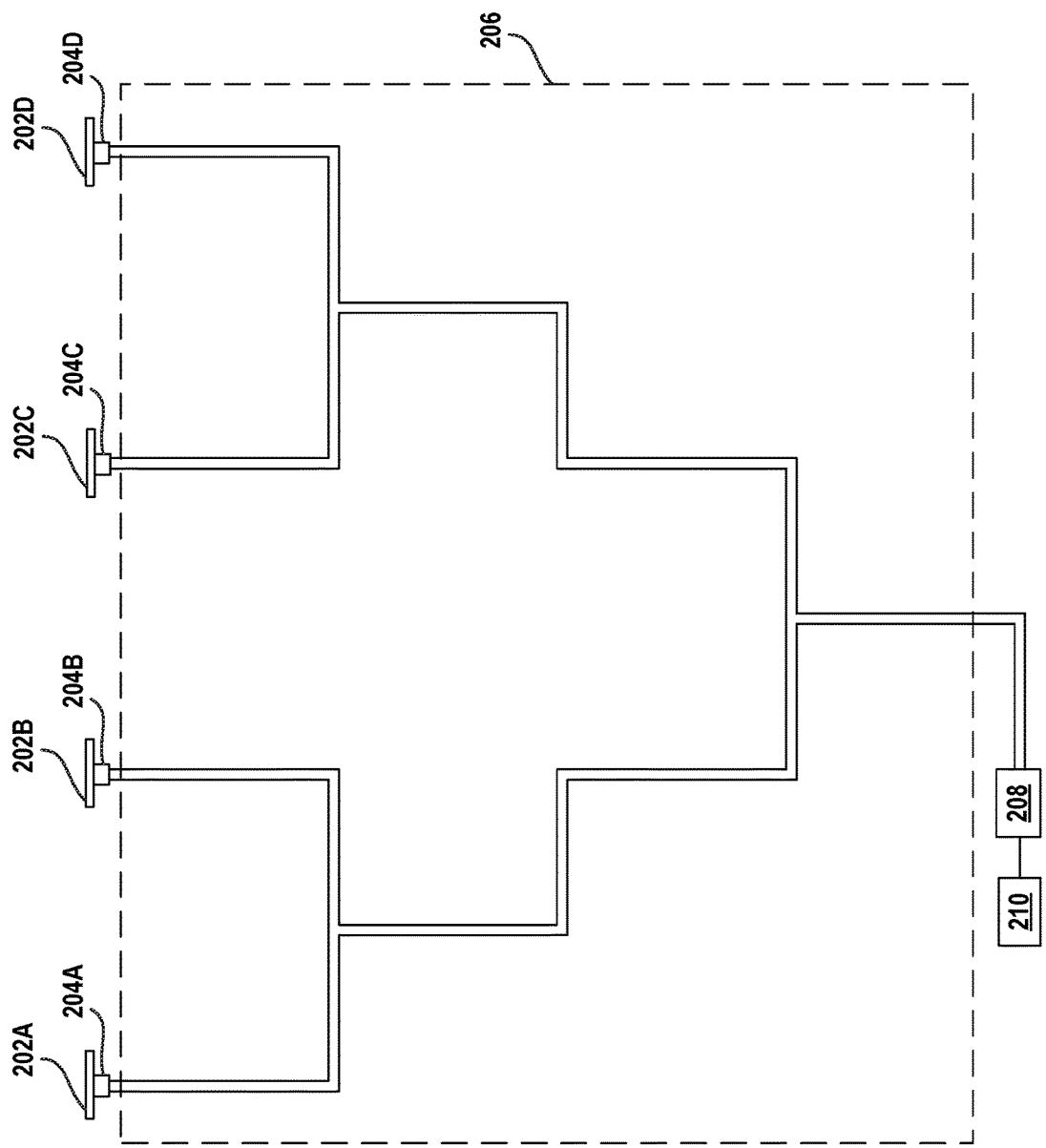
FIG. 2 illustrates an example corporate feed network for feeding an antenna array, according to an example embodiment.

FIG. 2 illustrates an example corporate feed network 200 for feeding an antenna array, according to an example embodiment. A corporate feed is a method of feeding antennas that keeps the phase of the signal provided to each antenna the same as each other antenna. FIG. 2 is described in the present disclosure in the context of transmitting signals. However, the structure of FIG. 2 may also be used with an array of antennas for receiving signals. Additionally, for simplicity, FIG. 2 is shown in a single plane with a linear array of antenna elements. In practice, a corporate feed 200 may also be used with antennas that form a two-dimensional conformal array.

As shown in FIG. 2, the corporate feed network 200 has an array of antenna elements, antennas 202A-202D. The antennas 202A-202D may be coupled to respective phase and amplitude controllers 204A-204B. In some examples, the respective phase and amplitude controllers 204A-204B may be able to control the phase and/or amplitude of the signals that are fed to the respective antennas. The respective phase and amplitude controllers 204A-204B may each control the phase and amplitude provided to a given antenna based on the taper profile. In examples where the taper profile determines if an antenna is enabled or disabled, the respective phase and amplitude controllers 204A-204B may be switches or diodes. The respective phase and amplitude controllers 204A-204B may either allow a signal (or block a signal) to be fed to the associated antenna. In yet further examples, the respective phase and amplitude controllers 204A-204B may simply be a matched load when the phase and amplitude controllers are associated with an antenna that is disabled according to the taper profile and may be a physical connection to the antenna that is enabled according to the taper profile.

The respective phase and amplitude controllers 204A-204B are coupled to metallic traces 206. The metallic traces 206 function to route signals for transmission by the antennas and also to divide power for transmission by the antennas. In other examples, the metallic traces may take a different form than that shown in FIG. 2. Different examples may include different branching than the metallic traces shown in FIG. 2.

The corporate feed network 200 may be coupled to radio front-end hardware 208 and radar processing system 210. The radio front-end hardware 208 may be coupled to an input feed of the corporate feed network 200. The radio front-end hardware 208 may be configured to provide signal up-conversion for transmitted signals and signal down-conversion for received signals. The radio front-end hardware may be coupled to the radar processing system 210. For transmitting radar signals, the radar processing system may create a low-frequency radar signal that is communicated to the radio front-end hardware 208. The radio front-end hardware 208 may upconvert the low-frequency radar signal to the desired transmission frequency. For receiving radar signals, the radio front-end hardware 208 may downcovert the received radar signals to a low-frequency radar signal. The low-frequency radar signal may be communicated to the radar processing system 210 for processing.

In some examples, the radio front-end hardware 208 and the radar processing system 210 may not be located near each other. For example, the radio front-end hardware 208 may be mounted on a substrate that contains the antennas 202A-202D and the corporate feed network 200. The radar processing system 210 may be located near a navigation system or other control system of the aircraft. The radio front-end hardware 208 and the radar processing system 210 may be communicable coupled by a low-frequency communication link. The radio front-end hardware 208 may include low power mixers and signal generators. In some examples, the radio front-end hardware 208 may be powered by a renewable power source.

Figure 3A:
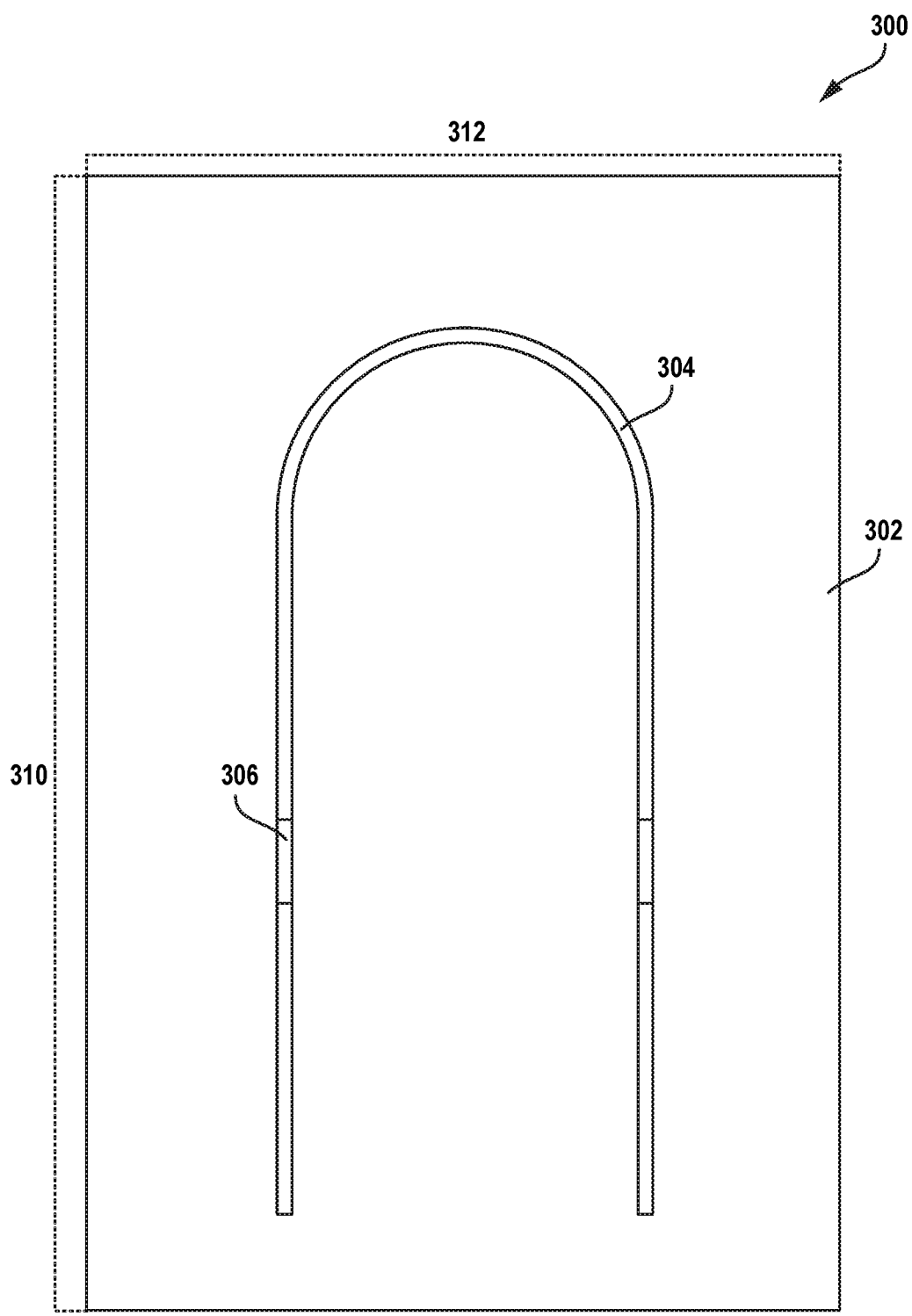
FIG. 3A illustrates a top view of an example patch antenna having a slot, according to an example embodiment.

FIG. 3A illustrates a top view of an example patch antenna 300 having a slot 304, according to an example embodiment and FIG. 3B illustrates a side view of an example patch antenna 300 having a slot 304, according to an example embodiment. The patch antenna 300 may be a single antenna element for use in the antenna arrays described in this disclosure. Further, the patch antenna may be fed by a corporate feed network, such as corporate feed network 200 of FIG. 2. Additionally, the patch antenna 300 may be thin enough to where it is flexible. Thus, the patch antenna 300 may be able to conform to a surface (such as a rounded portion of an aircraft) to which it is mounted. However, in other examples, patch antenna 300 may be used in situations. The patch antenna 300 may be used as a single antenna element, such as in a cellular communication system. In additional examples, the patch antenna 300 may be mounted on a rigid substrate, such as a ceramic, such as those applications that do not involved conforming to a surface. Thus, while the patch antenna 300 may be used within the applications of this disclosure, its applications are not limited to those of this disclosure.

The patch antenna 300 may be mounted on a substrate 308 that has a top half 308A and a bottom half 308B. The patch antenna 300 includes a rectangular metal patch 302 having a slot 304. The metal patch 302 may be fed by a stripline 306. In some examples, the stripline 306 may be located in the center of the thickness of substrate 308 where the top half 308A and bottom half 308B form a plane. The substrate 308 may be a flexible substrate that can conform to a curvature of the surface on which the substrate 308 is mounted. Additionally, the substrate 308 may be large enough to have a full antenna array and feeding structures incorporated in it. Examples may also include a ground plane or back plane on the bottom side of the bottom half 308B. However, in other examples, the back plane may be formed by a metallic surface of an aircraft when the antenna is installed on the aircraft.

The patch antenna 300 may have dimensions based on a desired frequency of operation for the antenna. In some examples, the patch antenna 300 may be designed to operate in the W-band (i.e., between 75 and 110 GHz). For W-band operations, the patch antenna 300 may have a thickness of less than 10 mil, including the substrate but not the front-end radio hardware. In some other examples, the patch antenna 300 may be designed to operate with K-band frequencies (i.e., between 18 and 27 GHz). For K-band operations, the patch antenna 300 may have a thickness of less than 20 mil, including the substrate and front-end radio hardware. However, in other examples, a different frequency (or range of frequencies) may be used as well. The rectangular metal patch 302 may have a length dimension 310 that is equal to three-quarters the wavelength at a desired frequency of operation and width dimension 312 that is equal to one-half the wavelength at a desired frequency of operation. In some examples, the patch antenna 300 may operate over a bandwidth of frequencies. In this case, the patch antenna 300 may be designed with dimensions based on a frequency within the bandwidth of frequencies, such as the middle frequency.

In some examples, the length dimension 310 and the width dimension 312 may be adjusted based on a permittivity of the substrate 308. For example, the length dimension 310 and/or the width dimension 312 may be reduced by an amount proportional to the permittivity of the substrate.

The rectangular metal patch 302 may have a slot 304. The slot 304 is an area that does not have metal. For example, the slot may be etched or cut through the rectangular metal patch 302. The slot 304 may have length equal to (or approximately equal to) 92.5% of the length of a wavelength at the frequency of operation. Because the length of the slot 304 may be greater than the dimensions of the rectangular metal patch 302, it may be desirable for the slot 304 to have a shape that allows it to fit on the rectangular metal patch 302. The slot 304 may have a U-shape with two arms parallel to the long dimension of the rectangular metal patch 302. The two parallel arms may cause the slot 304 to have a polarization that primarily linear. Additionally, the slot 304 may be centered on the rectangular metal patch 302.

In order to drive the antenna, a stripline 306 may be located in the substrate 308 and pass below the rectangular metal patch 302. The stripline 306 may be the end of the corporate feed network described with respect to FIG. 2. The stripline 306 may also be aligned orthogonally to the arms of the slot 304 and cross the arms of the slot 304 near the middle of the arms. Thus, the stripline may be located at the center of the longer dimension of the rectangular metal patch 302. The placement of the stripline 306 with respect to the rectangular metal patch 302 and the slot 304 may cause an input impedance of the rectangular metal patch 302 to be approximately 50 Ohms at the design frequency. By having an input impedance of approximately 50 Ohms the need for impedance matching hardware or components may be mitigated.

Figure 4:
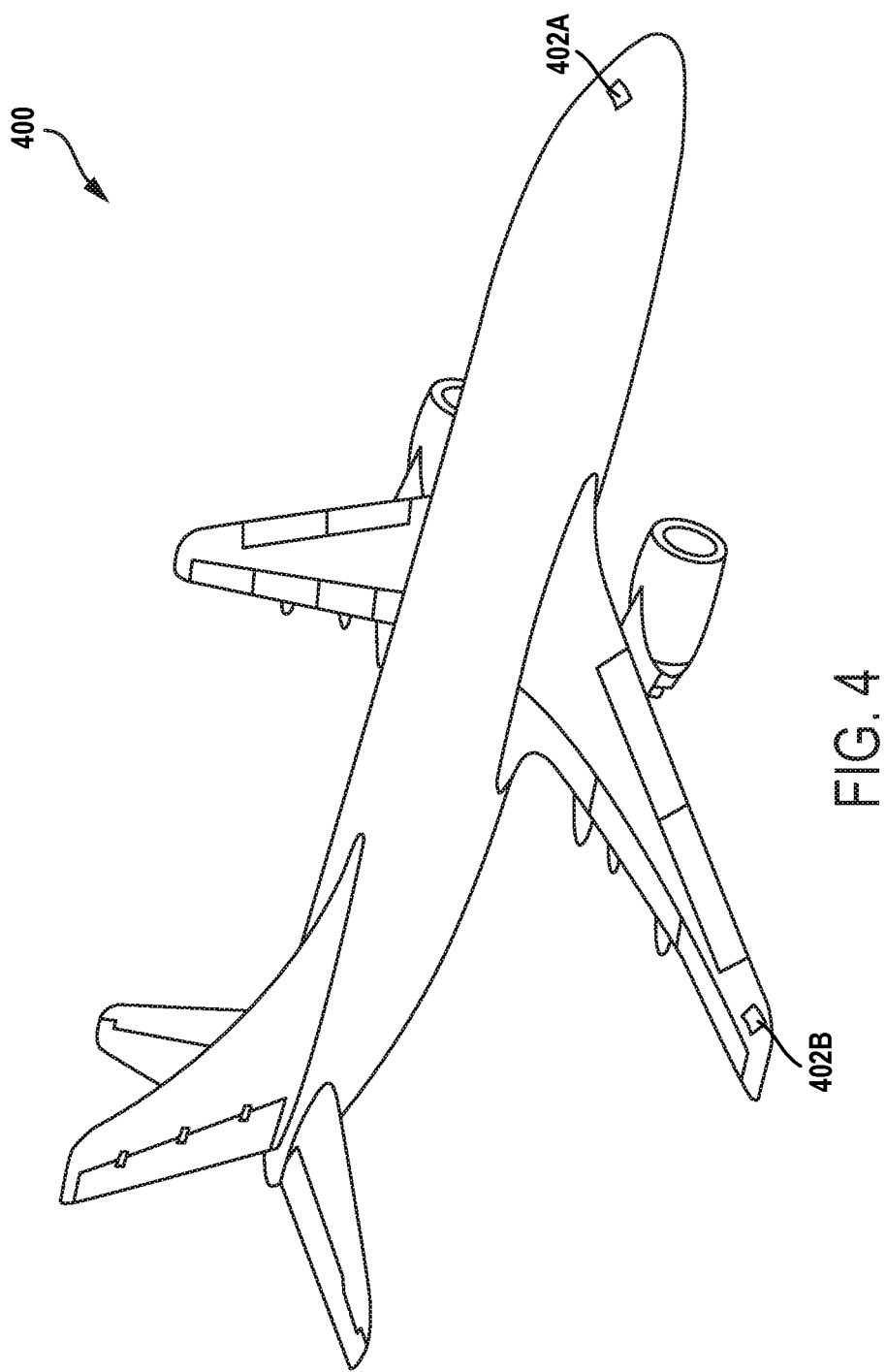
FIG. 4 illustrates an example aircraft, according to an example embodiment.

FIG. 4 illustrates an example aircraft 400, according to an example embodiment. The aircraft 400 is representative of any type of aircraft, such as passenger jets, unmanned aerial vehicles, helicopters, other types of jets, spacecraft, etc. FIG. 4 displays examples of how a conformal arrays, such as conformal array 402A and conformal array 402B may be placed on an aircraft. An aircraft may feature one or more antenna arrays for use in a radar system. While conventional arrays are flat structures that are often hidden by radomes, the present array is a conformal array configured to conform to the surface of the aircraft 400 upon which it is mounted. In other examples, the conformal array may be located on the wings, top or bottom of the fuselage, or other areas of the aircraft as well.

As an example, a conformal array 402A may be located near the front of the front of the aircraft. In another example, a conformal array 402B may be located near the edge of a wing of the aircraft. The present conformal arrays may be advantageous for several reasons. First, a conformal array may be located on a surface of an aircraft that is not flat, thus, any surface of the aircraft may be suitable for a conformal array. Second, conventional radar systems generally have a flat array mounted under a radome. By using a conformal array, the aircraft structure may be designed without the need to create dedicated space for a radar array and radome. The conformal array me mounted on an aircraft after the aircraft structure is designed and built.

Figure 5:
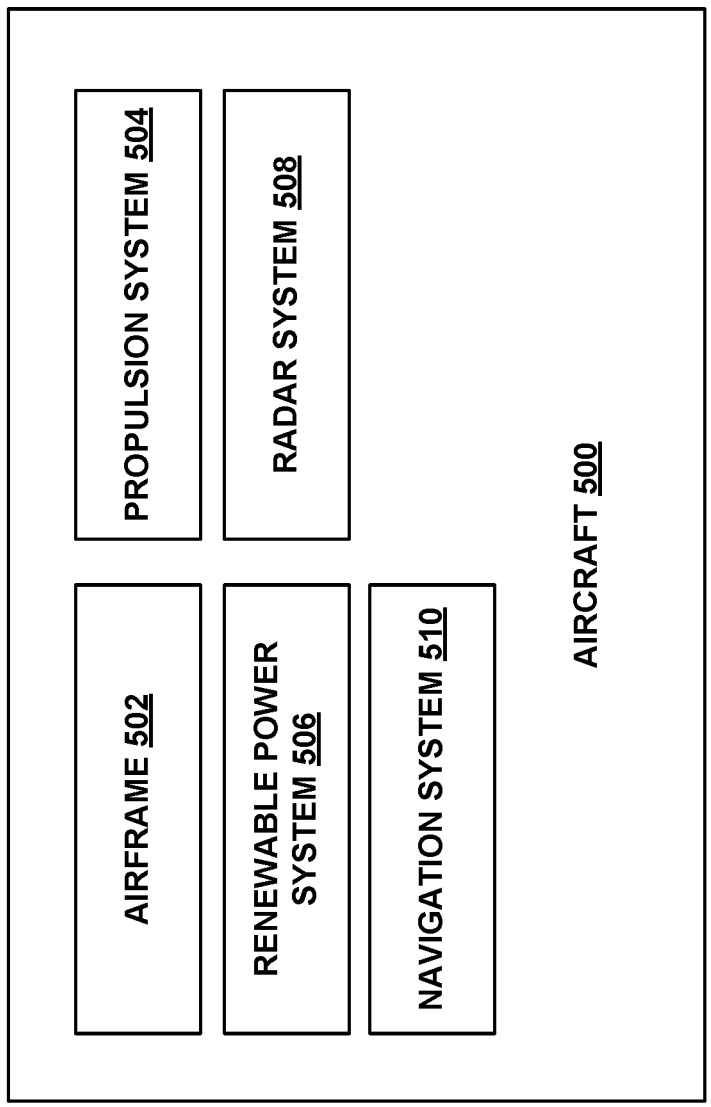
FIG. 5 is a block diagram of various systems of an aircraft.

FIG. 5 is a block diagram of various systems of an aircraft 500. The aircraft 500 may include an airframe 502, a propulsion system 504, renewable power system(s) 506, a radar system 508, a navigation system 510, and other systems (not shown). The airframe 502 may be the metallic outer surface of the aircraft the associated supporting structure. Various portions of the airframe 502 may take a curved shape. As previously discussed, curved portions of an aircraft's structure may make it difficult to place conventional radar antenna arrays. Thus, the present radar system 508 includes a conformal array that may be placed on a curved surface of the airframe.

The propulsion system 504 of the aircraft may include various different types of engines. The propulsion system 504 may include jet engines, ramjet engines, propeller engines, turboprop engines, as well as other types of aircraft propulsion as well. The propulsion system 504 may function to both provide propulsion for the aircraft, but also generate some electricity for use by various systems of the aircraft 500.

The aircraft 500 may also include one or more renewable power system(s) 506. The renewable power system(s) 506 may be solar power or other another type of renewable power system. The renewable power system(s) 506 may function to produce electricity for the various systems of the aircraft 500. In some examples, the renewable power system(s) 506 may also include an energy storage unit, such as a battery. In some examples, the renewable power system(s) 506 may supply power to the battery to store for when power is needed. In additional examples, power generated by the propulsion system 504 may also be stored in the energy storage unit. In some examples, the peak power produced by the renewable power system(s) 506 may be enough to power the radar system 508 of the aircraft. In some other examples, the peak power produced by the renewable power system(s) 506 may be enough to power the radar system 508 and the navigation system 510 of the aircraft. However, in some other examples, the radar system 508 and the navigation system 510 may only receive a subset of their electrical needs from the renewable power system(s) 506.

Figure 6:
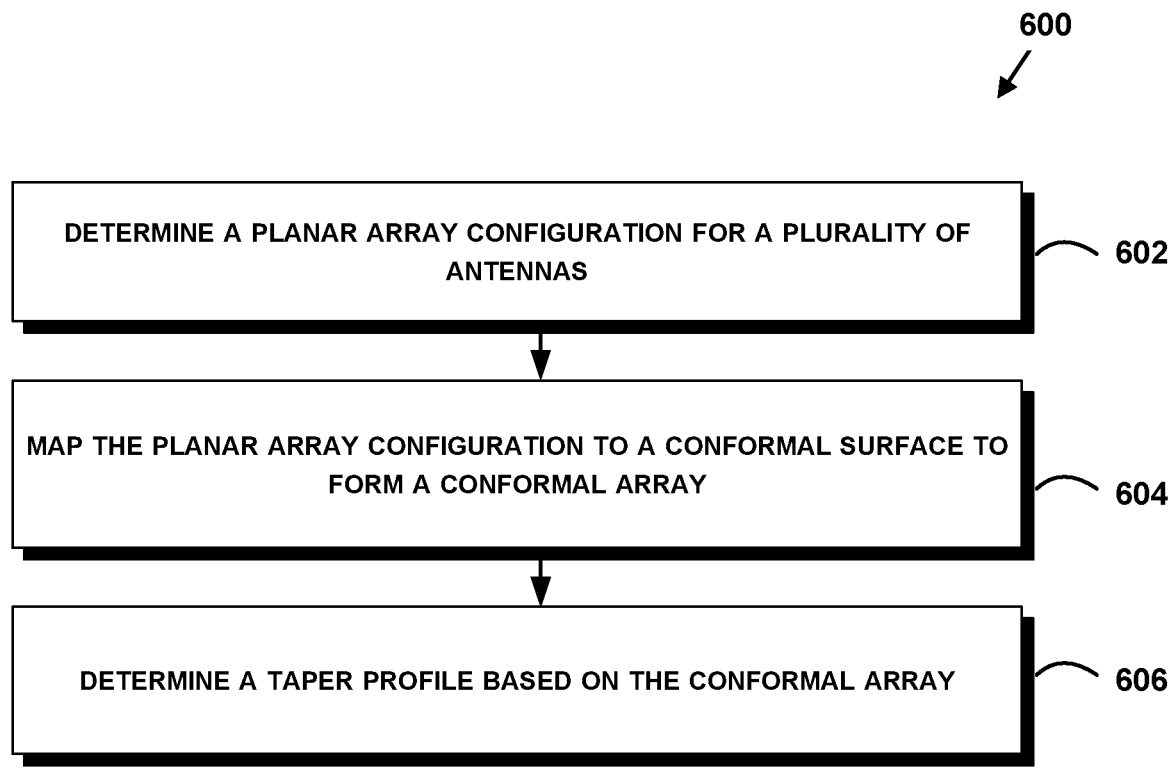
FIG. 6 shows a flowchart of an example method of forming a conformal array, according to an example embodiment.

FIG. 6 shows a flowchart of an example method of forming a conformal array, according to an example embodiment. Method 600 may be used with or implemented by the systems shown in FIGS. 1-5.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 600 may include one or more operations, functions, or actions as illustrated by one or more of blocks 602-606. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 602, the method 600 includes determining a planar array configuration for a plurality of antennas. The planar array configuration may be determined in part based on a set of performance criteria for the antenna array. As previously discussed, it may be desirable to have a main beam having a predetermined beam width and sidelobes (i.e., grating lobes) that are below a sidelobe threshold. In practice, such as in a radar system, it may be desirable for the main beam to be relatively narrow and for sidelobes to be −15 dB (or less) with respect to the main lobe. Sidelobes are undesirable because they direct energy in directions other than the intended direction, increase received signal noise from reflections, cause the reception of unintended signals, increase clutter signals in radar applications, etc. Thus, a planar array may be designed to meet the given design criteria and cause a minimization of grating lobes.

The array may specify a number of antennas, a radiation pattern for a given antenna of the array, and a layout for the antennas in the array. In some examples, determining a planar array may include determining a two-dimensional array. A two-dimensional array may have antennas aligned in a grid pattern having a length and width. Additionally, the antennas may have a spacing that is uniform along both dimensions of the array.

At block 604, the method 600 includes mapping the planar array configuration to a conformal surface to form a conformal array. Once the base planar array is designed at block 602, a mapping may be used to map the flat array to the conformal surface. In some examples, the mapping may be a "bending" of the flat array onto the shape of the surface to which the antenna will conform. In other examples, the mapping may be a projection of the antenna elements into a position that conforms to the surface. Other mappings from the flat surface to a conformal shape are possible as well.

At block 606, the method 600 includes determining a taper profile based on the conformal array. Once the mapping is created at block 604, the antenna may be stimulated in software to determine a base radiation pattern. In some examples, the antenna may be simulated using a method of moments simulation to determine the base antenna parameters of the radiation pattern, such as sidelobe levels and beam width. Based on the results of the simulation, a windowing function may be chosen. Some example windowing functions include a Chebyshev window, Hamming window, or other windowing function. The windowing function that is chosen may be based on some parameters of the antenna design, such as beamwidth, desired sidelobes, or other design criteria. In some examples, determining the taper profile includes determining a taper profile that causes array grating lobes to be at or below a grating lobe threshold causing a minimization of grating lobes. The result of the windowing function may be the taper profile.

In examples where low power and low complexity are desired, the windowing function may include constraints that specify that antennas may only be enabled or disabled. An array where antennas are only enabled or disabled may be known as a sparse array. Thus, in some examples, determining the taper profile includes determining an enabled subset of the antennas. Additionally, creating a sparse array may also include determining a corporate feed beamforming network based on the taper profile. In some examples, the corporate feed may include routing signals only to the enabled antennas. In other examples, the corporate feed may include routing signals only to all the antennas of the array. In this example, each antenna may have an associated switching element that may be able to control if each antenna is enabled or disabled. Thus, the switches (e.g., diodes or another electrical component) may control if antennas are enabled or disabled.

In additional examples, the windowing function may include constraints that specify that antennas may have relative power and/or phase adjustments. Thus, in some examples, determining the taper profile may also include determining respective power level for each antenna of the plurality of antennas. Additionally, in examples determining the taper profile includes determining a respective phase for each antenna of the plurality of antennas. In these examples, each antenna may have an associated element that may be able to control relative power and/or phase for each antenna. Thus, the electrical components may control the relative power and/or phase for each antenna. In another example, the feed structure may be a modified corporate feed to provide the determined power and/or phase for each antenna.

Once the taper profile is determined, the conformal antenna array may again be simulated with the given taper profile. The results of the simulation may be compared to the design criteria. If the design criteria are met, the taper profile may be used for the construction of the antenna. Otherwise, a different windowing function or different constraints on the windowing function may be used. Thus, unlike conventional conformal array designs, the present conformal antenna array determines the taper profile of the antenna in its conformed state, not in its flat state. Thus, overall array performance may be increased.

Figure 7:
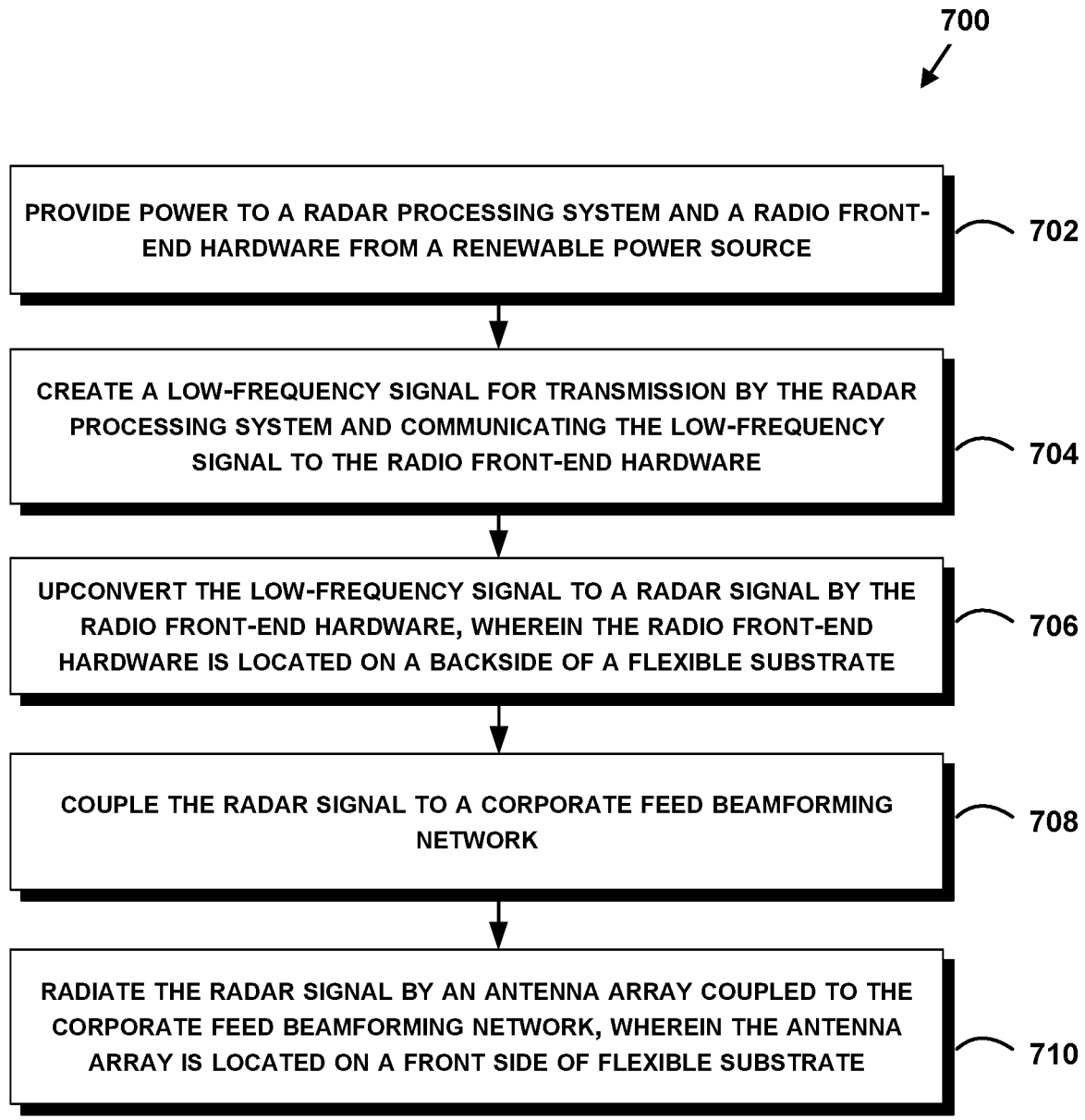
FIG. 7 shows a flowchart of an example method of operating a radar system, according to an example embodiment.

FIG. 7 shows a flowchart of an example of a method 700 of operating a radar system, according to an example embodiment. Method 700 may be used with or implemented by the systems shown in FIGS. 1-5.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 700 may include one or more operations, functions, or actions as illustrated by one or more of blocks 702-710. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 702, the method 700 includes providing power to a radar processing system and a radio front-end hardware from a renewable power source. The aircraft to which the radar system forms a part may have a means of generating renewable power. In some examples, the renewable energy source includes solar panels. Other aircraft-based sources of renewable power are possible as well. In some examples, a power requirement of the radar processing system and the radio front-end hardware is less than the power supplied by the renewable energy source. Thus, the renewable power source may be able to supply all the power needed by the radar system. In some examples, the renewable power source may be coupled to a battery or other electrical storage device. In these examples, power generated by the renewable power source may be stored by the battery or energy storage device may be stored for later use.

At block 704, the method 700 includes creating a low-frequency signal for transmission by the radar processing system and communicating the low-frequency signal to the radio front-end hardware. The radar processing system may be configured to create signals for transmission by the radar system. The signals may include a desiring signaling mode for the radar system. The signals created by the radar processing system may be low-frequency signals. These low frequency radar signals may be communicated from the radar processing system to the radio front-end hardware located on the substrate of the antenna array. By communicating low-frequency signals, transmission losses may be mitigated.

In some examples, the radar processing system may be located near other computational devices of the aircraft, for example, a navigation system. The radar processing system may be in communication with the navigation system (or other systems of the aircraft) in order to provide data that may be used for navigation of the aircraft.

At block 706, the method 700 includes upconverting the low-frequency signal to a radar signal by the radio front-end hardware. The radio front-end hardware may be located on a backside of a flexible substrate. The radio front-end hardware may be low-power to reduce the energy usage and heat produced by the radio front-end hardware. The radio-front end hardware may include mixers (or similarly functioning electronic components) configured to upconvert the frequency of the signal from the radio processing system. In some examples, upconverting the low-frequency signal includes upconverting the low-frequency signals to a radar signal having a K-band frequency. In other examples, upconverting may be to W-band frequencies. Other frequencies may be used as well.

Additionally, when the radio front-end hardware is coupled to the substrate, the structure of the substrate, including the radio front-end hardware and antennas, has a thickness of 60 mils or less. In some other examples, the structure of the substrate, including the radio front-end hardware and antennas, has a thickness of 20 mils or less. By keeping the thickness relatively thin, the flexibility of the substrate may be maintained. Additionally, in some examples, the radio front-end hardware may be located in a way to reduce the impact on the flexibility of the substrate.

At block 708, the method 700 includes coupling the radar signal to a corporate feed beamforming network. When the radar signal is coupled to the corporate feed beamforming network, the corporate feed beamforming network may split the power in order to feed the antennas of the array. As previously discussed, the corporate feed beamforming network may be a modified corporate feed that provides adjustments to the phase and amplitude of the signals for each respective antenna, based on the taper profile. In other examples, each antenna may have an associated component that can enable or disable a respective antenna, based on the taper profile. In yet another example, each antenna may have an associated component that can adjust a relative phase and/or amplitude of a respective antenna, based on the taper profile. Additionally, in some examples, at least a portion of the corporate feed beamforming network is located on a center plane of the flexible substrate. A backplane of the flexible substrate may be a metallic surface of the aircraft to which the array conforms.

At block 710, the method 700 includes radiating the radar signal by an antenna array coupled to the corporate feed beamforming network. The antenna array may be located on a front side of the flexible substrate. As previously discussed, the flexible substrate may be mounted to conform to a curved surface of an aircraft. Additionally, the corporate feed beamforming network is configured to flex along with the flexible substrate. At block 710, only a subset of the antennas of the array may radiate a signal, based on the taper profile.

Although method 700 is described with respect to transmitting signals, the method may also be performed in the reverse order for receiving signals. When performed in the reverse order, the antenna array may receive reflected radar signals. The radar signals received by the array may be routed through the corporate feed network to the radio front-end hardware. The radio front-end hardware may be configured to downconvert the received radar reflection signals to a low-frequency signal. These low-frequency signals may be communicated by way of a cable to the radar processing system. The radar processing system may be able to determine information (i.e., location and speed) about objects that caused the reflected through analyzing the low-frequency signals. The information determined about the objects that cause the reflections may be used by a navigational system of the aircraft.

Figure 8:
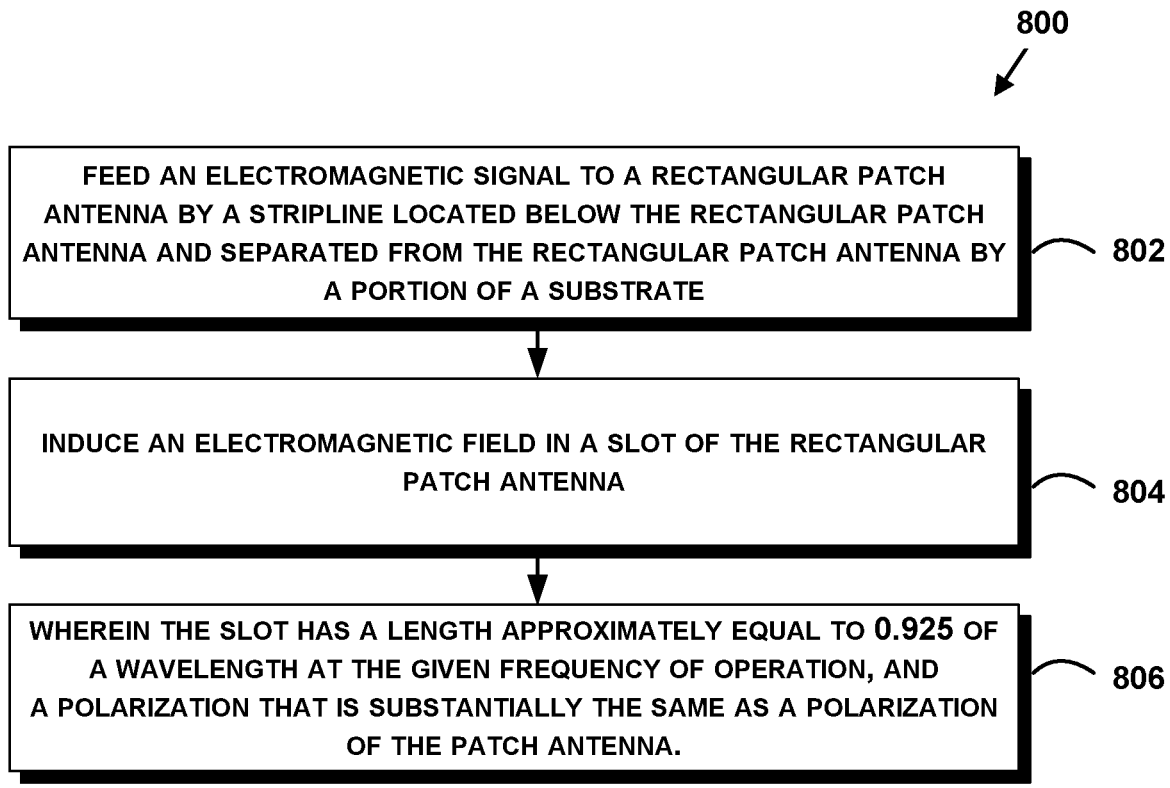
FIG. 8 shows a flowchart of an example method of operating an antenna, according to an example embodiment.

FIG. 8 shows a flowchart of an example method of operating an antenna, according to an example embodiment. Method 800 may be used with or implemented by the systems shown in FIGS. 1-5.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 800 may include one or more operations, functions, or actions as illustrated by one or more of blocks 802-806. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 802, the method 800 includes feeding an electromagnetic signal to a rectangular patch antenna by a stripline located below the rectangular patch antenna and separated from the rectangular patch antenna by a portion of a substrate. The rectangular patch antenna has a first dimension equal to one-half of a wavelength at a given frequency of operation. Additionally, the rectangular patch antenna has a second dimension equal to three-quarters of a wavelength at the given frequency of operation. The rectangular patch may have an input impedance that is approximately 50 Ohms at the given frequency.

At block 804, the method 800 includes inducing an electromagnetic field in a slot of the rectangular patch antenna. Inducing an electromagnetic field in the slot includes inducing an electromagnetic field in two arms of a U-shaped slot. The U-shaped slot may be located in the center of the rectangular patch. Additionally, the stripline crosses orthogonally to a direction of the straight portion of the two arms of a U-shaped slot.

At block 806, the method 800 includes wherein the slot has a length approximately equal to 0.925 of a wavelength at the given frequency of operation, and a polarization that is substantially the same as a polarization of the patch antenna. The length and positioning of the slot may cause the input impedance of the patch to be approximately 50 Ohms. Additionally, in some examples, the stripline may be located in the center of a height dimension of the substrate (where the height is measured in a direction orthogonal to a plane defined by a surface of the patch). Additionally, the combination of feeding the patch and inducing the field in the slot, may cause the entire structure to radiate electromagnetic energy into the region above the plane of the patch (in the opposite direction of the substrate). Further, in some examples, the present antenna may form an array of similar antennas, each configured to radiate signals in a similar manner. Moreover, each antenna may be fed by a stripline that forms a portion of a corporate feed network, as previously described.

By the term "substantially", "about", and "approximately" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft system comprising:
a conformal antenna array comprising:
a flexible substrate configured to conform to a curvature of a portion of an aircraft,
a plurality of antenna elements coupled to a first surface of the flexible substrate, wherein the plurality of antennas are formed in an array, and
radio front-end hardware configured to communicate signals to and from the plurality of antenna elements;
a radar processing system coupled to the radio front-end hardware; and
a renewable energy source configured to power the radar processing system and the radio front-end hardware.

2. The aircraft system of claim 1, wherein the antenna elements are configured to transmit and receive signals in a K band.

3. The aircraft system of claim 1, wherein:
the flexible substrate has a thickness of 20 mils or less; and
the conformal antenna array further comprises a corporate feed beamforming network coupled between at least a subset of the plurality of antenna elements and the radio front-end hardware, wherein at least a portion of the corporate feed beamforming network is located on a center plane of the flexible substrate.

4. The aircraft system of claim 1, wherein the radio front-end hardware is coupled to a second surface of the flexible substrate.

5. The aircraft system of claim 4, wherein the radio front-end hardware coupled to the substrate has a thickness of 60 mils or less.

6. The aircraft system of claim 1, wherein the renewable energy source comprises solar panels.

7. The aircraft system of claim 1, wherein a power requirement of the radar processing system and the radio front-end hardware is less than the power supplied by the renewable energy source.

8. A method of operating a radio system comprising:
providing power to a radar processing system and a radio front-end hardware from a renewable power source;
creating a low-frequency signal for transmission by the radar processing system and communicating the low-frequency signal to the radio front-end hardware;
upconverting the low-frequency signal to a radar signal by the radio front-end hardware, wherein the radio front-end hardware is located on a backside of a flexible substrate;
coupling the radar signal to a corporate feed beamforming network; and
radiating the radar signal by an antenna array coupled to the corporate feed beamforming network, wherein the antenna array is located on a front side of the flexible substrate.

9. The method of claim 8, wherein upconverting the low-frequency signal comprises upconverting to a radar signal having a K band frequency.

10. The method of claim 8, wherein:
the flexible substrate is mounted to conform to a curved surface of an aircraft; and
the corporate feed beamforming network is configured to flex along with the flexible substrate.

11. The method of claim 8, wherein the flexible substrate has a thickness of 20 mils or less; and
further comprising routing radar signals from the radio front-end hardware to at least a subset of a plurality of antennas of the antenna array by the corporate feed beamforming network, wherein at least a portion of the corporate feed beamforming network is located on a center plane of the flexible substrate.

12. The method of claim 8, wherein the radio front-end hardware coupled to the substrate has a thickness of 60 mils or less.

13. The method of claim 8, wherein the renewable power source comprises solar panels.

14. The method of claim 8, wherein a power requirement of the radar processing system and the radio front-end hardware is less than the power supplied by the renewable power source.

15. A radiating structure comprising:
a flexible substrate having a top surface, a bottom surface, and a plane located between the top surface and the bottom surface, wherein the plane is substantially parallel to at least one of the top surface and the bottom surface;
an antenna array comprising a plurality of antenna elements in a two-dimensional array, wherein the antennas are coupled to the top surface of the flexible substrate;
radio front-end hardware configured to communicably couple to a radar processor, wherein:
the radio front-end hardware is located on the bottom surface of the flexible substrate, and
the radio front-end hardware is configured to upconvert signals from the radar processor and output a radar signal; and
a corporate feed beamforming network coupled between at least a subset of the plurality of antenna elements and the radio front-end hardware, wherein the corporate feed beamforming network is configured to feed the radar signal from the radio front-end hardware to the at least a subset of the plurality of antenna elements.

16. The radiating structure of claim 15, wherein at least a portion of the corporate feed beamforming network is located on the plane.

17. The radiating structure of claim 15, wherein the radio front-end hardware is further configured to:
downconvert radar reflection signals received by the at least a subset of the plurality of antenna elements; and
communicate the downconverted signals to the radar processor.

18. The radiating structure of claim 15, wherein the flexible substrate has a thickness of 20 mils or less.

19. The radiating structure of claim 15, wherein the flexible substrate is configured to conform to a curvature of a portion of an aircraft.

20. The radiating structure of claim 19, wherein the corporate feed beamforming network is configured to apply a taper profile to the antenna array based on the curvature of the portion of the aircraft.

* * * * *